United States Patent
Cheng et al.

(10) Patent No.: US 11,206,214 B2
(45) Date of Patent: Dec. 21, 2021

(54) VIRTIO PORT-BASED DATA TRANSMISSION METHOD AND SYSTEM

(71) Applicant: Xiamen Wangsu Co., Ltd., Fujian (CN)

(72) Inventors: Duyong Cheng, Xiamen (CN); Zhiwen Cao, Xiamen (CN)

(73) Assignee: XIAMEN WANGSU CO., LTD., Xiamen (CN)

( * ) Notice: Subject to any disclaimer, the term of this patent is extended or adjusted under 35 U.S.C. 154(b) by 27 days.

(21) Appl. No.: 16/858,079

(22) Filed: Apr. 24, 2020

(65) Prior Publication Data
US 2020/0382418 A1 Dec. 3, 2020

Related U.S. Application Data

(63) Continuation of application No. PCT/CN2019/090329, filed on Jun. 6, 2019.

(30) Foreign Application Priority Data

Apr. 24, 2019 (CN) .......................... 201910334745.4

(51) Int. Cl.
*H04L 12/713* (2013.01)
*H04L 12/741* (2013.01)
*H04L 29/12* (2006.01)

(52) U.S. Cl.
CPC ............ *H04L 45/586* (2013.01); *H04L 45/74* (2013.01); *H04L 61/6022* (2013.01)

(58) Field of Classification Search
CPC ......... H04L 49/30; H04L 49/70; H04L 45/74; H04L 49/253; H04L 49/3009;
(Continued)

(56) References Cited

U.S. PATENT DOCUMENTS

| 10,708,082 B1 * | 7/2020 | Bakiaraj | H04L 41/5051 |
| 2011/0274110 A1 * | 11/2011 | Mmmadi | H04L 63/1466 370/392 |

(Continued)

FOREIGN PATENT DOCUMENTS

| CN | 102075907 A | 5/2011 |
| CN | 102801729 A | 11/2012 |

(Continued)

OTHER PUBLICATIONS

Xiamen Wangsu Co., Ltd., CN First Office Action, CN201910334745. 4, dated Feb. 23, 2021, 6 pgs.
(Continued)

*Primary Examiner* — Wutchung Chu
(74) *Attorney, Agent, or Firm* — USCH Law, PC

(57) ABSTRACT

The present disclosure provides a Virtio port-based data transmission method and system, and relates to the field of virtualization technologies. The method includes: determining, by a Vswitch, when receiving first data content sent by a physical adapter, a first Vswitch logical port that sends the first data content, and adding a port identifier of the first Vswitch logical port into the first data content; sending, by the Vswitch, the first data content to a Vrouter by using the first Vswitch logical port and a Virtio port shared by the Vswitch and the Vrouter; receiving, by the Vrouter, the first data content by using a first Vrouter logical port uniquely corresponding to the port identifier of the first Vswitch logical port, and sending the first data content to a first virtual network adapter corresponding to the first Vrouter logical port.

13 Claims, 4 Drawing Sheets

(58) Field of Classification Search
CPC ............... H04L 45/586; H04L 61/6022; H04L 45/7453; H04L 41/0806; H04L 45/38; H04L 12/4641; H04L 47/24; G06F 9/45504; G06F 9/45558; G06F 9/5077; G06F 9/455

See application file for complete search history.

(56) References Cited

U.S. PATENT DOCUMENTS

| | | | |
|---|---|---|---|
| 2014/0003445 A1 | 1/2014 | Lee et al. | |
| 2014/0115578 A1* | 4/2014 | Cooper | H04L 63/205 718/1 |
| 2016/0147556 A1* | 5/2016 | Hu | G06F 9/45558 718/1 |
| 2017/0177396 A1 | 6/2017 | Palermo et al. | |
| 2017/0324826 A1* | 11/2017 | Johnsen | H04L 12/185 |
| 2018/0212869 A1* | 7/2018 | Wu | H04L 45/38 |
| 2018/0219770 A1* | 8/2018 | Wu | H04L 49/70 |
| 2018/0254981 A1* | 9/2018 | Babu | H04L 45/26 |
| 2019/0379729 A1* | 12/2019 | Patel | G06F 11/3433 |
| 2020/0073692 A1* | 3/2020 | Rao | G06F 9/45558 |
| 2020/0097269 A1* | 3/2020 | Wang | G06F 9/45516 |
| 2020/0204492 A1* | 6/2020 | Sarva | H04L 45/586 |
| 2020/0236041 A1* | 7/2020 | Yu | H04L 49/70 |
| 2021/0092057 A1* | 3/2021 | Devireddy | H04L 45/54 |

FOREIGN PATENT DOCUMENTS

| | | |
|---|---|---|
| CN | 107666442 A | 6/2018 |
| CN | 108390809 A | 8/2018 |
| CN | 109104296 A | 12/2018 |
| CN | 109426549 A | 3/2019 |
| EP | 3370158 A1 | 9/2018 |

OTHER PUBLICATIONS

Xiamen Wangsu Co., Ltd., Extended European Search Report, EP19872251.4, dated May 12, 2021, 10 pgs.

"Virtual I/O Device (VIRTIO) Version 1.1," Oasis-Open.org, Dec, 20, 2018, 118 pgs.

Xiamen Wangsu Co., International Search Report, PCT/CN2019/ 090329, dated Jan. 2, 2020, 4 pgs.

* cited by examiner

VIRTIO PORT-BASED DATA TRANSMISSION METHOD AND SYSTEM

CROSS-REFERENCE TO RELATED APPLICATIONS

The present disclosure is a continuation of PCT Application No. PCT/CN2019/090329, entitled "VIRTIO PORT-BASED DATA TRANSMISSION METHOD AND SYSTEM", filed Jun. 6, 2019, which claims priority to Chinese Patent Application No. 201910334745.4, entitled "VIRTIO PORT-BASED DATA TRANSMISSION METHOD AND SYSTEM", filed Apr. 24, 2019, each of which is incorporated by reference herein in its entirety.

TECHNICAL FIELD

The present disclosure relates to the field of virtualization technologies, and in particular, to a Virtio port-based data transmission method and system.

BACKGROUND

A virtualized network includes components such as a virtual router (Vrouter) and a virtual switch (Vswitch). A Virtio technology is a standard for abstract interface of paravirtualized devices. A Virtio port is usually used to implement data transmission between the Vrouter and the Vswitch. A Virtio port located on a Vswitch may be referred to as a Virtio_host port, and a Virtio port located on a Vrouter may be referred to as a Virtio_user port.

A Vswitch may be connected to a plurality of Vrouters. Each Vrouter may create a Virtio_user port for a virtual network adapter of a tenant network managed by the Vrouter. If a tenant network is configured with a plurality of virtual network adapters, the Vrouter needs to create a Virtio_user port for each virtual network adapter of the tenant network. Correspondingly, the Vswitch also needs to create a corresponding Virtio_host port. That a virtual network adapter receives data is used as an example. When a physical adapter receives data content sent to a certain virtual network adapter (which may be referred to as a target virtual network adapter), the physical adapter may send the data content to the Vswitch. Subsequently, the Vswitch may first identify the Virtio_host port of the data content, and then sends, through the Virtio_host port, the data content to a Virtio_user port corresponding to the Virtio_host port. In this way, a Vrouter in which the Virtio_user port is located may receive the data content, and then sends the data content to the target virtual network adapter.

During implementation of the present disclosure, the inventor finds at least the following problems existing in the existing technology.

Each Virtio port needs to occupy a specific size of memory resources. When a large number of Virtio ports are created, a large number of memory resources are occupied, resulting in a relatively large impact on data transmission. Consequently, transmission performance is relatively low.

SUMMARY

In order to overcome the problems in the existing technology, some embodiments of the present disclosure provide a Virtio port-based data transmission method and system. The technical solutions are as follows.

According to some embodiments, a Virtio port-based data transmission method comprises:

determining, by a Vswitch, when receiving first data content sent by a physical adapter, a first Vswitch logical port that sends the first data content, and adding a port identifier of the first Vswitch logical port into the first data content;

sending, by the Vswitch, the first data content to a Vrouter by using the first Vswitch logical port and a Virtio port shared by the Vswitch and the Vrouter;

receiving, by the Vrouter, the first data content by using a first Vrouter logical port uniquely corresponding to the port identifier of the first Vswitch logical port, and sending the first data content to a first virtual network adapter corresponding to the first Vrouter logical port;

receiving, by a protocol stack, the first data content decapsulated by the first virtual network adapter, converting the first data content into second data content, and sending the second data content to a second virtual network adapter;

receiving, by the Vrouter, by using a second Vrouter logical port corresponding to the second virtual network adapter, the second data content encapsulated by the second virtual network adapter, and adding a port identifier of the second Vrouter logical port into the second data content;

sending, by the Vrouter, the second data content to the Vswitch by using the second Vrouter logical port and the Virtio port; and receiving, by the Vswitch, the second data content by using a second Vswitch logical port uniquely corresponding to the port identifier of the second Vrouter logical port, and sending the second data content to the physical adapter.

In some embodiments, determining, by the Vswitch, the first Vswitch logical port that sends the first data content includes:

determining, by the Vswitch, based on a MAC address carried in the first data content, a Vswitch logical port that corresponds, in a port address list, to the MAC address carried in the first data content, as the first Vswitch logical port that sends the first data content.

In some embodiments, before receiving the first data content sent by the physical adapter, the method further includes:

preconfiguring, according to the number of virtual network adapters managed by the Vrouter, the same number of Vswitch logical ports and Vrouter logical ports in the Vswitch and the Vrouter respectively, where a port identifier of the Vswitch logical port uniquely corresponds to a port identifier of the Vrouter logical port; and generating a mapping table in which a correspondence among the Vswitch logical port, the Vrouter logical port, and the virtual network adapter is recorded.

In some embodiments, adding the port identifier of the first Vswitch logical port into the first data content includes:

recording, by the Vswitch, the port identifier of the first Vswitch logical port in a preset field of a data structure mbuf of the first data content.

In some embodiments, receiving, by the Vrouter, the first data content by using a first Vrouter logical port uniquely corresponding to the port identifier of the first Vswitch logical port, and sending the first data content to the first virtual network adapter corresponding to the first Vrouter logical port includes:

determining, by the Vrouter, according to the mapping table, the first Vrouter logical port uniquely corresponding to the port identifier of the first Vswitch logical port; and receiving, by the Vrouter, the first data content by using the determined first Vrouter logical port, and sending the first data content to the first virtual network adapter corresponding to the first Vrouter logical port.

In some embodiments, converting the first data content into the second data content, and sending the second data content to the second virtual network adapter includes:

determining, by the protocol stack, whether a destination IP address carried in the first data content is an IP address of the first virtual network adapter;

when the destination IP address carried in the first data content is the IP address of the first virtual network adapter: submitting, by the protocol stack, the first data content to an application layer for processing, and receiving response content of the first data content returned by the application layer, searching, by the protocol stack, for the second virtual network adapter and a next-hop route based on a routing table, modifying a source MAC address of the response content into a MAC address of the second virtual network adapter, modifying a destination MAC address of the response content into a MAC address of the next-hop route, to obtain the second data content, and sending the second data content to the second virtual network adapter; and when the destination IP address carried in the first data content is not the IP address of the first virtual network adapter: searching, by the protocol stack, for the second virtual network adapter and a next-hop route based on the routing table, modifying a source MAC address of the first data content into a MAC address of the second virtual network adapter, modifying a destination MAC address of the first data content into a MAC address of the next-hop route, to obtain the second data content, and sending the second data content to the second virtual network adapter.

According to some embodiments, a Virtio port-based data transmission system is provided, including a Vswitch module, a Vrouter module, and a protocol stack module.

The Vswitch module is configured to determine, when receiving first data content sent by a physical adapter, a first Vswitch logical port that sends the first data content, and add a port identifier of the first Vswitch logical port into the first data content.

The Vswitch module is further configured to send the first data content to the Vrouter module by using the first Vswitch logical port and a Virtio port shared by the Vswitch module and the Vrouter module.

The Vrouter module is configured to receive the first data content by using a first Vrouter logical port uniquely corresponding to the port identifier of the first Vswitch logical port, and send the first data content to a first virtual network adapter corresponding to the first Vrouter logical port.

The protocol stack module is configured to receive the first data content decapsulated by the first virtual network adapter, convert the first data content into second data content, and send the second data content to a second virtual network adapter.

The Vrouter module is further configured to receive, by using a second Vrouter logical port corresponding to the second virtual network adapter, the second data content encapsulated by the second virtual network adapter, and add a port identifier of the second Vrouter logical port into the second data content.

The Vrouter module is further configured to send the second data content to the Vswitch module by using the second Vrouter logical port and the Virtio port.

The Vswitch module is further configured to receive the second data content by using a second Vswitch logical port uniquely corresponding to the port identifier of the second Vrouter logical port, and send the second data content to the physical adapter.

In some embodiments, the Vswitch module is further configured to:

determine, based on a MAC address carried in the first data content, a Vswitch logical port that corresponds, in a port address list, to the MAC address carried in the first data content, as the first Vswitch logical port that sends the first data content.

In some embodiments, the system further includes a port configuration module configured to:

preconfigure, according to the number of virtual network adapters managed by the Vrouter module, the same number of Vswitch logical ports and Vrouter logical ports in the Vswitch module and the Vrouter module respectively, where a port identifier of the Vswitch logical port uniquely corresponds to a port identifier of the Vrouter logical port; and generate a mapping table in which a correspondence among the Vswitch logical port, the Vrouter logical port, and the virtual network adapter is recorded.

For example, the Vswitch module is further configured to:

record the port identifier of the first Vswitch logical port in a preset field of a data structure mbuf of the first data content.

In some embodiments, the Vrouter module is further configured to:

determine, according to the mapping table, the first Vrouter logical port uniquely corresponding to the port identifier of the first Vswitch logical port; and receive the first data content by using the determined first Vrouter logical port, and send the first data content to the first virtual network adapter corresponding to the first Vrouter logical port.

In some embodiments, the protocol stack module is further configured to:

determine whether a destination IP address carried in the first data content is an IP address of the first virtual network adapter;

when the destination IP address carried in the first data content is the IP address of the first virtual network adapter: submit the first data content to an application layer for processing, and receive response content of the first data content returned by the application layer, search for the second virtual network adapter and a next-hop route based on a routing table, modify a source MAC address of the response content into a MAC address of the second virtual network adapter, modify a destination MAC address of the response content into a MAC address of the next-hop route, to obtain the second data content, and send the second data content to the second virtual network adapter; and when the destination IP address carried in the first data content is not the IP address of the first virtual network adapter: search for the second virtual network adapter and a next-hop route based on the routing table, modify a source MAC address of the first data content into a MAC address of the second virtual network adapter, modify a destination MAC address of the first data content into a MAC address of the next-hop route, to obtain the second data content, and send the second data content to the second virtual network adapter.

Beneficial effects brought by the technical solutions provided in the embodiments of the present disclosure are as follows.

In some embodiments, the Vswitch and the Vrouter may add a channel identifier of a logical port into the data content. Because the logical port of the Vswitch uniquely corresponds to the logical port of the Vrouter, and the logical port of the Vrouter uniquely corresponds to the virtual network adapter, a pair of logical ports for transmitting data content to the virtual network adapter may be determined by using the channel identifier. In this way, the Vswitch and the Vrouter may implement receiving and sending of data content of a plurality of virtual network adapters via one Virtio port, thereby simplifying the manner of data transmission between the Vrouter and the Vswitch. Not only data transmission between the Vrouter and the Vswitch is more stable, but also more memory resources may be released in that memory occupied by the logical port is less than that occupied by the Virtio port in the existing technology due to a simple structure of the logical port. In addition, a time for Virtio port polling may also be reduced by using a common Virtio port for transmission. Therefore, data transmission performance can be improved.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show some embodiments of this application, and those of ordinary skill in the art may still derive other drawings from these accompanying drawings without creative efforts.

DETAILED DESCRIPTION

To make the objectives, technical solutions, and advantages of this application clearer, the following further describes the embodiments of this application in detail with reference to the accompanying drawings.

An embodiment of the present disclosure provides a Virtio port-based data transmission method. The method may be performed by a server that provides virtualization. By running a virtualization program, virtual devices such as a Vrouter and a Vswitch may be virtualized on the server, to build a virtual network. The Vrouter and the Vswitch may use a Data Plane Development Kit (DPDK) framework. On the one hand, the Vswitch is connected to an external physical adapter, and on the other hand, the Vswitch may perform transmission of data content with a plurality of Vrouters via a plurality of Virtio ports, where each Virtio port corresponds to one Vrouter. The Vrouter may manage a plurality of virtual network adapters, and each virtual network adapter may provide a network service for a user. The data content may be represented in a plurality of forms, such as a data structure mbuf, a data packet, etc. No specific limitation is imposed on the data content herein. The server may include a processor, a memory, and a transceiver. The processor may be configured to process data transmitted based on the Virtio port in the following procedure, the memory may be configured to store data required and generated during processing, and the transceiver may be configured to receive and send relevant data during processing.

Figure 1:
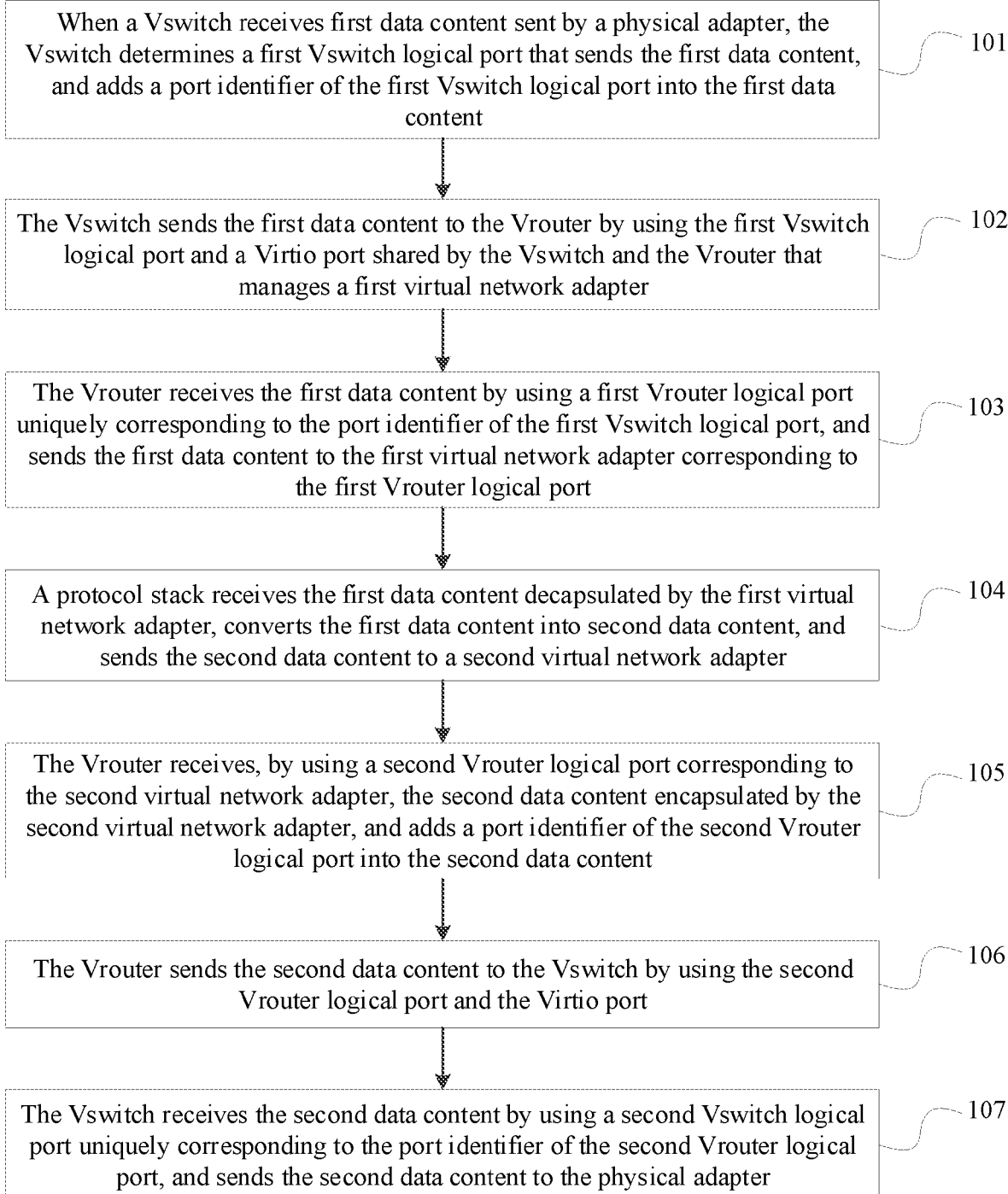
FIG. 1 is a flowchart of a Virtio port-based data transmission method according to an embodiment of the present disclosure.

A processing procedure of a Virtio port-based data transmission method shown in FIG. 1 is described in detail below with reference to a specific embodiment. Content may be as follows.

Step 101: When a Vswitch receives first data content sent by a physical adapter, the Vswitch determines a first Vswitch logical port that sends the first data content, and adds a port identifier of the first Vswitch logical port into the first data content.

During implementation, the foregoing server may receive data content from an external device via a physical adapter of the server. When receiving specific data content (which may be referred to as first data content), the physical adapter may forward the first data content to a Vswitch that has been virtualized. In this way, the Vswitch may receive the first data content from the physical adapter. Subsequently, the Vswitch may identify a Vswitch logical port (which may be referred to as a first Vswitch logical port) for transmitting the first data content to a Vrouter. Then, the Vswitch may perform port marking on the first data content, that is, add a port identifier of the first Vswitch logical port into the first data content, so that in the subsequent procedure, the Vrouter may identify, based on the port identifier of the first Vswitch logical port, the Vswitch logical port that sends the first data content.

For example, determining the first Vswitch logical port in step 101 may be specifically processed as follows. The Vswitch determines, based on a MAC address carried in the first data content, a Vswitch logical port that corresponds to the MAC address carried in the first data content and that is in a port address list, as the first Vswitch logical port that sends the first data content.

During implementation, the Vswitch may maintain a port address list, and a correspondence between each MAC address and each logical port of the Vswitch is recorded in the port address list. In this way, the Vswitch may parse four-tuple information of the first data content after receiving the first data content, to obtain the destination MAC address carried in the first data content. Then, the Vswitch may search for a Vswitch logical port corresponding to the destination MAC address in the port address list, and determines the found Vswitch logical port as the first Vswitch logical port that sends the first data content.

For example, the addition of the port identifier in step 101 may be specifically processed as follows. The Vswitch records the port identifier of the first Vswitch logical port in a preset field of a data structure such as a DPDK mbuf of the first data content.

During implementation, because data content may be transmitted between Virtio ports by using the data structure mbuf, and the data structure mbuf has a preset field, such as a Ptag field, the port identifier may be recorded in the preset field to add the port identifier into the data content. In this way, the Vswitch may add the port identifier of the first Vswitch logical port into the first data content in the foregoing manner of adding the port identifier.

For example, when the preset field is a Ptag field, if the port identifier of the first Vswitch logical port is 07, Ptag=07 may be set, so that the port identifier of the first Vswitch logical port may be added into the first data content. In addition, when the data content is transmitted in a form of a data packet, the port identifier may be directly added by using a Vlan field in the packet. For example, when the port identifier of the first Vswitch logical port is 07, vlan=07 may be set, so that the port identifier of the first Vswitch logical port may be added into the first data content.

Step 102: The Vswitch sends the first data content to the Vrouter by using the first Vswitch logical port and a Virtio port shared by the Vswitch and the Vrouter that manages a first virtual network adapter.

During implementation, generally, only one Virtio port needs to be disposed between the Vswitch and the Vrouter to complete transmission of data content. Therefore, the Vswitch and the Vrouter share one Virtio port. In consideration of load and redundancy requirements, a plurality of Virtio ports may also be disposed to be shared by the Vswitch and the Vrouter. Because the number of Virtio ports is far fewer than that of the virtual network adapters, occupied memory resources can be greatly reduced. In particular, after performing port marking on the first data content, the Vswitch may send the first data content to the Vrouter. In particular, the Vswitch may first send the first data content to a Virtio_host port on the Vswitch via the first Vswitch logical port, and then send the first data content to a Virtio_user port on the Vrouter via the Virtio_host port, so that the first data content may be sent to the Vrouter.

Step 103: The Vrouter receives the first data content by using a first Vrouter logical port uniquely corresponding to the port identifier of the first Vswitch logical port, and sends the first data content to the first virtual network adapter corresponding to the first Vrouter logical port.

During implementation, after the Virtio_user port of the Vrouter receives the first data content, the first Vswitch logical port that sends the first data content may be identified based on the port identifier carried in the first data content, and then the first Vrouter logical port corresponding to the first Vswitch logical port, that is, the first Vrouter logical port uniquely corresponding to the port identifier of the first Vrouter logical port, may be determined based on the port identifier of the first Vrouter logical port. Subsequently, the Vrouter may send the first data content to the first Vrouter logical port via the Virtio_user port. In this way, the first Vrouter logical port may receive the first data content, and then may send the first data content to the corresponding first virtual network adapter.

It is worth mentioning that in a conventional solution for Virtio port-based data transmission, although a plurality of logical ports are created for both the Vswitch and the Vrouter, there is no transmission path through which the logical ports of the Vswitch and the Vrouter may identify each other. In order to accurately transmit data content from a Vswitch logical port to a corresponding Vrouter logical port, a dedicated Virtio port needs to be configured between each pair of Vswitch logical port and Vrouter logical port as a dedicated channel for data transmission between the Vswitch logical port and the Vrouter logical port. However, in the present disclosure, because the Vswitch logical port and the Vrouter logical port are preconfigured to uniquely correspond to each other, and the port identifier is added into the data content, the data content sent by the Vswitch logical port may be transmitted to the Vrouter through only one shared Virtio port. Further, the Vrouter may receive the data content from the shared Virtio port when receiving the data content, and then determine, based on the port identifier carried in the data content, the corresponding Vrouter logical port, so that the data content may be accurately transmitted to the Vrouter logical port corresponding to the Vswitch logical port. Because only one or relatively few Virtio ports are needed, not only occupied memory resources can be reduced, but also a time for the Virtio port polling may be greatly reduced, or even port polling is not required, so that the time for Virtio port polling is saved, thereby improving data transmission performance. In addition, a manner of data transmission between the Vrouter and the Vswitch may further be simplified, so that data transmission between the Vrouter and the Vswitch is more stable.

It should be noted that the foregoing server may preconfigure an equal number of Vswitch logical ports and Vrouter logical ports in the Vswitch and the Vrouter respectively according to the number of virtual network adapters managed by the Vrouter. A port identifier of the Vswitch logical port uniquely corresponds to a port identifier of the Vrouter logical port, that is, for a certain Vrouter logical port in the Vrouter, there is only one Vswitch logical port corresponding to the Vrouter logical port in the Vswitch, and port identifiers of the Vswitch logical port and the Vrouter logical port are also unique in the Vswitch and the Vrouter. In addition, a correspondence among Vswitch logical ports, Vrouter logical ports, and virtual network adapters may be recorded in a mapping table.

For example, step 103 may be specifically processed as follows. The Vrouter determines, according to the mapping table, the first Vrouter logical port uniquely corresponding to the port identifier of the first Vswitch logical port; and the Vrouter receives the first data content via the determined first Vrouter logical port, and sends the first data content to the first virtual network adapter corresponding to the first Vrouter logical port.

During implementation, after the Virtio_user port of the Vrouter receives the first data content, the Vrouter may search, based on the port identifier carried in the first data content, for the first Vrouter logical port corresponding to the port identifier in the mapping table. Therefore, the Vrouter may send the first data content to the found first Vrouter logical port via the Virtio_user port. In this way, the first Vrouter logical port may receive the first data content, and then may send, based on the correspondence between the Vrouter logical port and the virtual network adapter recorded in the mapping table, the first data content to a virtual network adapter, that is, the first virtual network adapter that corresponds to the first Vrouter logical port.

Step 104: A protocol stack receives the first data content decapsulated by the first virtual network adapter, converts the first data content into second data content, and sends the second data content to a second virtual network adapter.

During implementation, the first virtual network adapter may decapsulate the first data content after receiving the first data content, that is, a processing on a frame header and a frame tail, that are carried in the first data content, may be performed, and then may send the decapsulated first data content to the protocol stack of a Vrouter. In this way, the protocol stack may receive the first data content, and then may determine a corresponding conversion manner based on the first data content to convert the first data content into the second data content. In addition, the protocol stack may further determine a virtual network adapter (which may be referred to as a second virtual network adapter) for receiving the second data content, and then may send the second data content to the second virtual network adapter.

For example, step 104 may be specifically processed as follows. The protocol stack determines whether a destination IP address carried in the first data content is an IP address of the first virtual network adapter. If the destination IP address carried in the first data content is the IP address of the first virtual network adapter, the protocol stack submits the first data content to an application layer for processing, and receives response content of the first data content returned by the application layer. The protocol stack searches for the second virtual network adapter and a next-hop route based on a routing table, modifies a source MAC address of the response content into the MAC address of the second virtual network adapter, modifies a destination MAC address of the response content into the MAC address of the next-hop route, to obtain the second data content, and sends the second data content to the second virtual network adapter. If the destination IP address carried in the first data content is not the IP address of the first virtual network adapter, the protocol stack searches for the second virtual network adapter and a next-hop route based on the routing table, modifies a source MAC address of the first data content into the MAC address of the second virtual network adapter, modifies a destination MAC address of the first data content into the MAC address of the next-hop route, to obtain the second data content, and sends the second data content to the second virtual network adapter.

During implementation, the protocol stack may determine, according to the destination IP address carried in the first data content after receiving the first data content, whether the first data content is data content to which the first virtual network adapter needs to respond. If the first data content is the data content to which first virtual network adapter needs to respond, the protocol stack may send the first data content to a corresponding application program of the application layer for processing, and then the protocol stack may obtain the response content corresponding to the first data content from the application program, and forwards the response content. If the first data content is not the data content to which the first virtual network adapter needs to respond, the protocol stack may directly forward the first data content based on the destination IP address.

In particular, the protocol stack may determine, by determining whether the destination IP address carried in the first data content is the IP address of the first virtual network adapter, whether the first data content is the data content to which the first virtual network adapter needs to respond. If the destination IP address carried in the first data content is the IP address of the first virtual network adapter, the protocol stack may search for the second virtual network adapter and the next-hop route based on the routing table, then modifies the source MAC address of the received response content into the MAC address of the second virtual network adapter, and modifies the destination MAC address of the response content into the MAC address of the next-hop route, to obtain the second data content, and then the protocol stack may send the second data content to the second virtual network adapter. If the destination IP address carried in the first data content is not the IP address of the first virtual network adapter, the protocol stack may search for the second virtual network adapter and the next-hop route based on a routing table, then modifies the source MAC address of the first data content into the MAC address of the second virtual network adapter, and modifies the destination MAC address of the first data content into the MAC address of the next-hop route, to obtain the second data content, and then the protocol stack may send the second data content to the second virtual network adapter.

Step 105: The Vrouter receives, by using a second Vrouter logical port corresponding to the second virtual network adapter, the second data content encapsulated by the second virtual network adapter, and adds a port identifier of the second Vrouter logical port into the second data content.

During implementation, the second virtual network adapter may encapsulate the second data content after receiving the second data content, that is, add a frame header and a frame tail, and then may send the encapsulated second data content to the Vrouter via the Vrouter logical port (which may be referred to as a second Vrouter logical port) corresponding to the second virtual network adapter. In this way, the Vrouter may receive the second data content, and then may perform port marking on the second data content, that is, add the port identifier of the second Vrouter logical port into the second data content.

Step 106: The Vrouter sends the second data content to the Vswitch by using the second Vrouter logical port and the Virtio port.

During implementation, the Vrouter may send the second data content to the Virtio_user port on the Vrouter via the second Vrouter logical port, and then send the second data content to the Virtio_host port on the Vswitch via the Virtio_user port on the Vrouter.

Step 107: The Vswitch receives the second data content by using a second Vswitch logical port uniquely corresponding to the port identifier of the second Vrouter logical port, and sends the second data content to the physical adapter.

During implementation, after the Virtio_host port of the Vswitch receives the second data content, the Vswitch may identify, based on the port identifier carried in the second data content, the second Vrouter logical port that sends the second data content, and then may determine the second Vswitch logical port corresponding to the second Vrouter logical port. In this way, the Vswitch may receive the second data content via the second Vswitch logical port, and then sends the second data content to the physical adapter.

Figure 2:
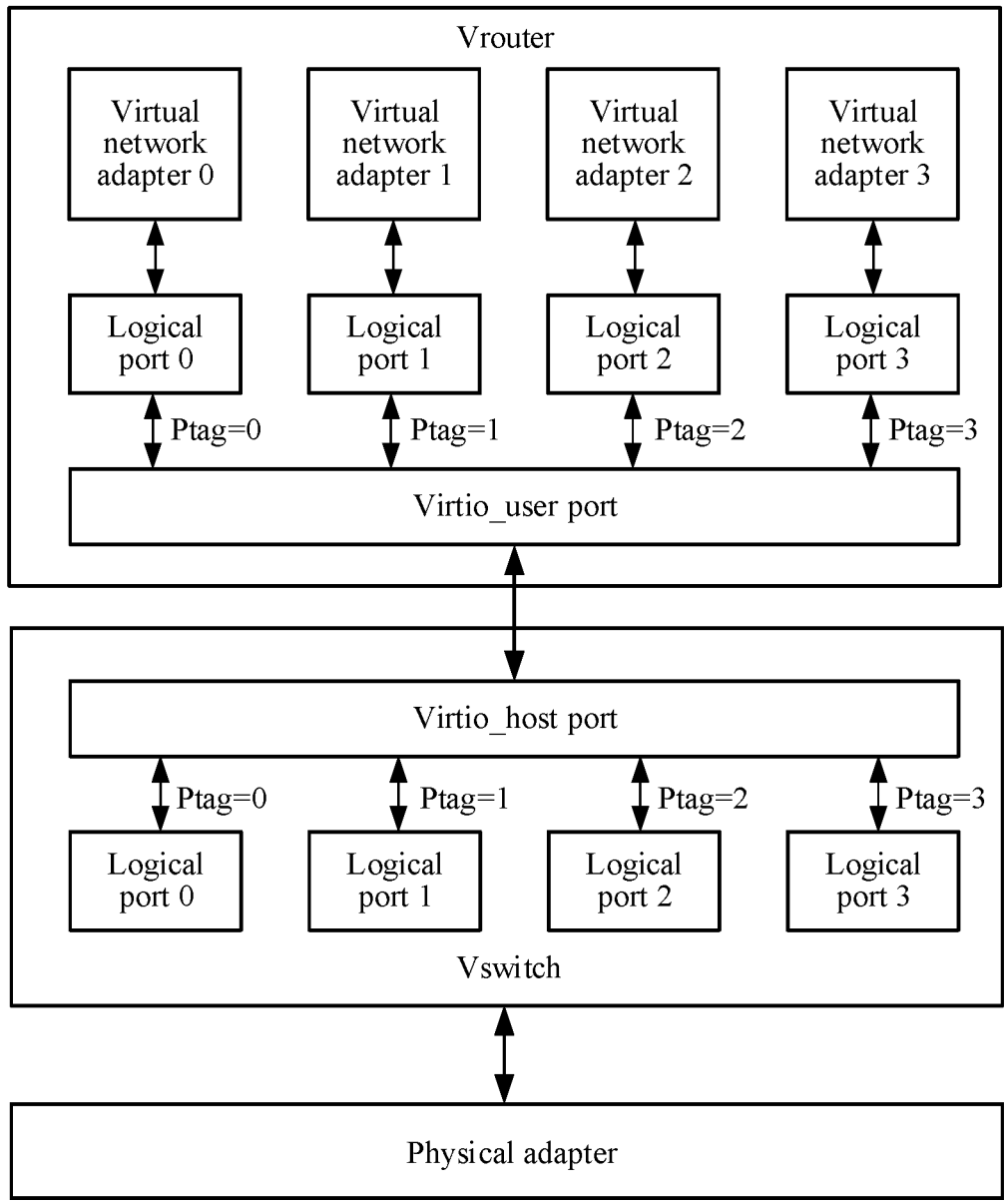
FIG. 2 is a diagram of a network scenario of a Virtio port-based data transmission method according to an embodiment of the present disclosure.

The foregoing network scenario of Virtio port-based data transmission is shown in FIG. 2 (in the figure, that the preset field is Ptag is used as an example).

In this embodiment, the Vswitch and the Vrouter may add a channel identifier of a logical port into data content. Because the logical port of the Vswitch uniquely corresponds to the logical port of the Vrouter, and the logical port of the Vrouter uniquely corresponds to the virtual network adapter, a pair of logical ports for transmitting data content to the virtual network adapter may be determined by using the channel identifier. In this way, the Vswitch and the Vrouter may implement receiving and sending of data content of a plurality of virtual network adapters via one Virtio port, thereby simplifying the manner of data transmission between the Vrouter and the Vswitch. Not only data transmission between the Vrouter and the Vswitch is more stable, but also more memory resources may be released in that memory occupied by the logical port is less than that occupied by the Virtio port in the existing technology due to a simple structure of the logical port. In addition, a time for Virtio port polling may also be reduced by using a single Virtio port for transmission. Therefore, data transmission performance can be improved.

Figure 3:
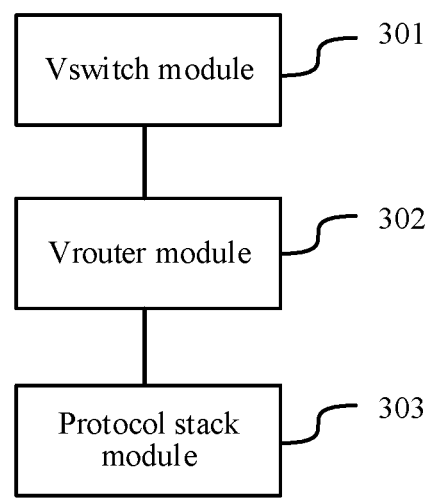
FIG. 3 is a schematic structural diagram of a Virtio port-based data transmission system according to an embodiment of the present disclosure.

Based on a same technical idea, an embodiment of the present disclosure further provides a Virtio port-based data transmission system. As shown in FIG. 3, the system includes a Vswitch module 301, a Vrouter module 302, and a protocol stack module 303.

The Vswitch module 301 is configured to determine, when first data content sent by a physical adapter is received, a first Vswitch logical port that sends the first data content, and add a port identifier of the first Vswitch logical port into the first data content.

The Vswitch module 301 is further configured to send the first data content to the Vrouter module 302 by using the first Vswitch logical port and a Virtio port shared by the Vswitch module and the Vrouter module.

The Vrouter module 302 is configured to receive the first data content by using a first Vrouter logical port uniquely corresponding to the port identifier of the first Vswitch logical port, and send the first data content to a first virtual network adapter corresponding to the first Vrouter logical port.

The protocol stack module 303 is configured to receive the first data content decapsulated by the first virtual network adapter, convert the first data content into second data content, and send the second data content to a second virtual network adapter.

The Vrouter module 302 is further configured to receive, by using a second Vrouter logical port corresponding to the second virtual network adapter, the second data content encapsulated by the second virtual network adapter, and add a port identifier of the second Vrouter logical port into the second data content.

The Vrouter module 302 is further configured to send the second data content to the Vswitch module 301 by using the second Vrouter logical port and the Virtio port.

The Vswitch module 301 is further configured to receive the second data content by using a second Vswitch logical port uniquely corresponding to the port identifier of the second Vrouter logical port, and send the second data content to the physical adapter.

For example, the Vswitch module 301 is further configured to:

determine, based on a MAC address carried in the first data content, a Vswitch logical port that, in a port address list, corresponds to the MAC address carried in the first data content, as the first Vswitch logical port that sends the first data content.

Figure 4:
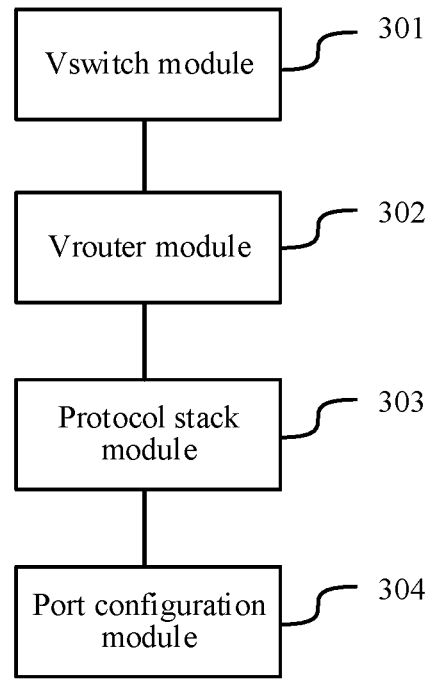
FIG. 4 is a schematic structural diagram of a Virtio port-based data transmission system according to another embodiment of the present disclosure.

For example, as shown in FIG. 4, the system further includes a port configuration module 304 configured to:

Preconfigure, according to the number of virtual network adapters managed by the Vrouter, the number of Vswitch logical ports and Vrouter logical ports in the Vswitch module 301 and the Vrouter module 302 respectively, where a port identifier of the Vswitch logical port uniquely corresponds to a port identifier of the Vrouter logical port; and generate a mapping table in which a correspondence among the Vswitch logical port, the Vrouter logical port, and the virtual network adapter is recorded.

For example, the Vswitch module 301 is further configured to:

record the port identifier of the first Vswitch logical port in a preset field of a data structure mbuf of the first data content.

For example, the Vrouter module 302 is further configured to:

determine, according to the mapping table, the first Vrouter logical port uniquely corresponding to the port identifier of the first Vswitch logical port; and receive the first data content by using the determined first Vrouter logical port, and send the first data content to the first virtual network adapter corresponding to the first Vrouter logical port.

For example, the protocol stack module 303 is further configured to:

determine whether a destination IP address carried in the first data content is an IP address of the first virtual network adapter; and submit, when the destination IP address carried in the first data content is the IP address of the first virtual network adapter, the first data content to an application layer for processing, and receive response content of the first data content returned by the application layer; and search for the second virtual network adapter and a next-hop route based on a routing table, modify a source MAC address of the response content into a MAC address of the second virtual network adapter, modify a destination MAC address of the response content into a MAC address of the next-hop route, to obtain the second data content, and send the second data content to the second virtual network adapter; or search, when the destination IP address carried in the first data content is not the IP address of the first virtual network adapter, for the second virtual network adapter and a next-hop route based on a routing table, modify a source MAC address of the first data content into a MAC address of the second virtual network adapter, modify a destination MAC address of the first data content into a MAC address of the next-hop route, to obtain the second data content, and send the second data content to the second virtual network adapter.

In this embodiment, the Vswitch and the Vrouter may add a channel identifier of a logical port into the data content. Because the logical port of the Vswitch uniquely corresponds to the logical port of the Vrouter, and the logical port of the Vrouter uniquely corresponds to the virtual network adapter, a pair of logical ports for transmitting data content to the virtual network adapter may be determined by using the channel identifier. In this way, the Vswitch and the Vrouter may implement receiving and sending of data content of a plurality of virtual network adapters via one Virtio port, thereby simplifying data transmission between the Vrouter and the Vswitch. Not only data transmission between the Vrouter and the Vswitch is more stable, but also more memory resources may be released in that memory occupied by the logical port is less than that occupied by the Virtio port in the existing technology due to a simple structure of the logical port. In addition, a time for Virtio port polling may also be reduced by using a single Virtio port for transmission. Therefore, data transmission performance can be improved.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

Figure 5:
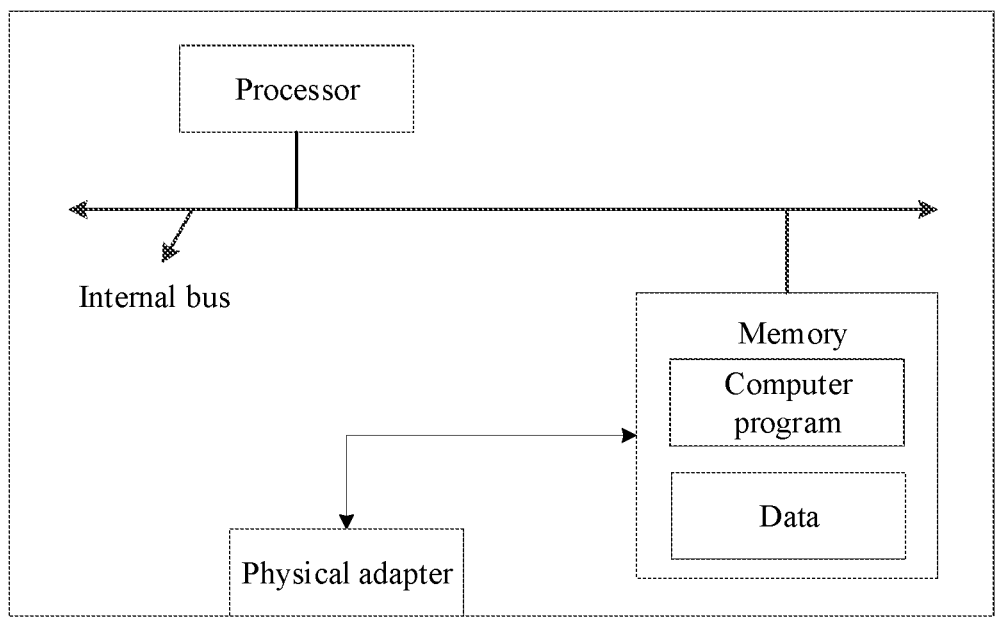
FIG. 5 is a schematic structural diagram of a Virtio port-based data transmission system according to a further embodiment of the present disclosure.

As shown in FIG. 5, an embodiment of the present disclosure further provides a Virtio port-based data transmission system. The system includes a physical adapter, a memory and one or more processor. The physical adapter and the one or more processor are communicated with the memory respectively. The memory stores a computer program including an instruction executable by the one or more processor. The instruction, when be executed by the one or more processor, causes the one or more processor to implement the above-described Virtio port-based data transmission method. The memory may be configured to store data required and generated during the processing procedure of the Virtio port-based data transmission method. For example, data received by the physical adapter is stored in the memory.

The foregoing descriptions are merely embodiments of this application, but are not intended to limit this application. Any modification, equivalent replacement, and improvement made without departing from the spirit and principle of this application shall fall within the protection scope of this application.

What is claimed is:

1. A Virtio port-based data transmission method, comprising:

determining, by a Vswitch, when receiving first data content sent by a physical adapter, a first Vswitch logical port by which to send the first data content, and adding a port identifier of the first Vswitch logical port into the first data content;

sending, by the Vswitch, the first data content to a Vrouter using the first Vswitch logical port and a Virtio port shared by the Vswitch and the Vrouter;

receiving, by the Vrouter, the first data content using a first Vrouter logical port uniquely corresponding to the port identifier of the first Vswitch logical port, and sending the first data content to a first virtual network adapter corresponding to the first Vrouter logical port;

receiving, by a protocol stack, the first data content decapsulated by the first virtual network adapter, converting the first data content into second data content, and sending the second data content to a second virtual network adapter;

receiving, by the Vrouter, using a second Vrouter logical port corresponding to the second virtual network adapter, the second data content encapsulated by the second virtual network adapter, and adding a port identifier of the second Vrouter logical port into the second data content;

sending, by the Vrouter, the second data content to the Vswitch using the second Vrouter logical port and the Virtio port; and receiving, by the Vswitch, the second data content using a second Vswitch logical port uniquely corresponding to the port identifier of the second Vrouter logical port, and sending the second data content to the physical adapter.

2. The method according to claim 1, wherein determining, by the Vswitch, the first Vswitch logical port that sends the first data content comprises:

determining, by the Vswitch, based on a MAC address carried in the first data content, a Vswitch logical port that corresponds, in a port address list, to the MAC address carried in the first data content, as the first Vswitch logical port that sends the first data content.

3. The method according to claim 1, before receiving the first data content sent by the physical adapter, further comprising: preconfiguring, according to a number of virtual network adapters managed by the Vrouter, the same number of Vswitch logical ports in the Vswitch and the same number of Vrouter logical ports in the Vrouter, respectively, wherein a port identifier of a respective Vswitch logical port uniquely corresponds to a port identifier of a corresponding Vrouter logical port; and generating a mapping table in which a correspondence among the respective Vswitch logical port, the corresponding Vrouter logical port, and a corresponding virtual network adapter is recorded.

4. The method according to claim 1, wherein adding the port identifier of the first Vswitch logical port into the first data content comprises:

recording, by the Vswitch, the port identifier of the first Vswitch logical port in a preset field of a data structure mbuf of the first data content.

5. The method according to claim 3, wherein receiving, by the Vrouter, the first data content by using a first Vrouter logical port uniquely corresponding to the port identifier of the first Vswitch logical port, and sending the first data content to the first virtual network adapter corresponding to the first Vrouter logical port comprises:

determining, by the Vrouter, according to the mapping table, the first Vrouter logical port uniquely corresponding to the port identifier of the first Vswitch logical port; and receiving, by the Vrouter, the first data content by using the determined first Vrouter logical port, and sending the first data content to the first virtual network adapter corresponding to the first Vrouter logical port.

6. The method according to claim 1, wherein converting the first data content into the second data content, and sending the second data content to the second virtual network adapter comprises:

determining, by the protocol stack, whether a destination IP address carried in the first data content is an IP address of the first virtual network adapter;

in response to the destination IP address carried in the first data content being the IP address of the first virtual network adapter: submitting, by the protocol stack, the first data content to an application layer for processing, receiving response content of the first data content returned by the application layer, searching, by the protocol stack, for the second virtual network adapter and a next-hop route based on a routing table, modifying a source MAC address of the response content into a MAC address of the second virtual network adapter, modifying a destination MAC address of the response content into a MAC address of the next-hop route, to obtain the second data content, and sending the second data content to the second virtual network adapter; and in response to the destination IP address carried in the first data content not being the IP address of the first virtual network adapter: searching, by the protocol stack for the second virtual network adapter and a next-hop route based on the routing table, modifying a source MAC address of the first data content into a MAC address of the second virtual network adapter, modifying a destination MAC address of the first data content into a MAC address of the next-hop route, to obtain the second data content, and sending the second data content to the second virtual network adapter.

7. A Virtio port-based data transmission system, comprising:

a physical adapter, a memory, communicated with the physical adapter;

one or more processors, communicated with the memory;

wherein the memory stores a computer program comprising an instruction executable by the one or more processor; the instruction, when executed by the one or more processor, causes the one or more processor to implement a Virtio port-based data transmission method;

wherein the memory stores a further program; the further program, when executed by the one or more processor, causes the one or more processor to implement a first virtual device Vswitch, a second virtual device Vrouter, a first virtual network adapter and a second virtual network adapter;

wherein the memory stores another program; the another program, when executed by the one or more processor, causes the one or more processor to implement a protocol stack;

wherein the memory stores data received by the physical adapter; and wherein the method comprises:

determining, by the Vswitch, when receiving first data content sent by the physical adapter, a first Vswitch logical port by which to send the first data content, and adding a port identifier of the first Vswitch logical port into the first data content;

sending, by the Vswitch, the first data content using the first Vswitch logical port and a Virtio port shared by the Vswitch and the Vrouter;

receiving, by the Vrouter, the first data content using a first Vrouter logical port uniquely corresponding to the port identifier of the first Vswitch logical port, and sending the first data content to the first virtual network adapter corresponding to the first Vrouter logical port;

receiving, by the protocol stack, the first data content decapsulated by the first virtual network adapter, converting the first data content into second data content, and sending the second data content to the second virtual network adapter;

receiving, by the Vrouter, using a second Vrouter logical port corresponding to the second virtual network adapter, the second data content encapsulated by the second virtual network adapter, and adding a port identifier of the second Vrouter logical port into the second data content;

sending, by the Vrouter, the second data content using the second Vrouter logical port and the shared Virtio port; and receiving, by the Vswitch, the second data content using a second Vswitch logical port uniquely corresponding to the port identifier of the second Vrouter logical port, and sending the second data content to the physical adapter.

8. The system according to claim 7, wherein determining, by the Vswitch, the first Vswitch logical port that sends the first data content comprises:

determining, by the Vswitch, based on a MAC address carried in the first data content, a Vswitch logical port that corresponds, in a port address list, to the MAC address carried in the first data content, as the first Vswitch logical port that sends the first data content.

9. The system according to claim 7, wherein, before receiving the first data content sent by the physical adapter, the method further comprises: preconfiguring, according to a number of virtual network adapters managed by the Vrouter, the same number of Vswitch logical ports in the Vswitch and the same number of Vrouter logical ports in the Vrouter, respectively, wherein a port identifier of a respective Vswitch logical port uniquely corresponds to a port identifier of a corresponding Vrouter logical port; and generating a mapping table in which a correspondence among the respective Vswitch logical port, the corresponding Vrouter logical port, and a corresponding virtual network adapter is recorded.

10. The system according to claim 7, wherein adding the port identifier of the first Vswitch logical port into the first data content comprises:

recording, by the Vswitch, the port identifier of the first Vswitch logical port in a preset field of a data structure mbuf of the first data content.

11. The system according to claim 9, wherein receiving, by the Vrouter, the first data content by using a first Vrouter logical port uniquely corresponding to the port identifier of the first Vswitch logical port, and sending the first data content to the first virtual network adapter corresponding to the first Vrouter logical port comprises:

determining, by the Vrouter, according to the mapping table, the first Vrouter logical port uniquely corresponding to the port identifier of the first Vswitch logical port; and receiving, by the Vrouter, the first data content by using the determined first Vrouter logical port, and send the first data content to the first virtual network adapter corresponding to the first Vrouter logical port.

12. The system according to claim 7, wherein converting the first data content into the second data content, and sending the second data content to the second virtual network adapter comprises:

determining, by the protocol stack, whether a destination IP address carried in the first data content is an IP address of the first virtual network adapter; and in response to the destination IP address carried in the first data content being the IP address of the first virtual network adapter: submitting, by the protocol stack, the first data content to an application layer for processing, and receiving response content of the first data content returned by the application layer, searching, by the protocol stack, for the second virtual network adapter and a next-hop route based on a routing table, modifying a source MAC address of the response content into a MAC address of the second virtual network adapter, modifying a destination MAC address of the response content into a MAC address of the next-hop route, to obtain the second data content, and sending the second data content to the second virtual network adapter; and in response to the destination IP address carried in the first data content not being the IP address of the first virtual network adapter: searching, by the protocol stack, for the second virtual network adapter and a next-hop route based on the routing table, modifying a source MAC address of the first data content into a MAC address of the second virtual network adapter, modifying a destination MAC address of the first data content into a MAC address of the next-hop route, to obtain the second data content, and sending the second data content to the second virtual network adapter.

13. A non-transitory and non-volatile computer readable storage medium, comprising first, second and third computer readable instructions, wherein the first computer-readable instructions, when read and executed by a processor, cause the processor to implement a Virtio port-based data transmission method;

wherein the second computer-readable instructions, when read and executed by the processor, cause the processor to implement a first virtual device Vswitch, a second virtual device Vrouter, a protocol stack, a first virtual network adapter and a second virtual network adapter;

wherein the third computer-readable instructions, when read and executed by the processor, cause the processor to implement a protocol stack;

wherein the Virtio port-based data transmission method comprises:

determining, by a Vswitch, when receiving first data content sent by a physical adapter, a first Vswitch logical port by which to send the first data content, and adding a port identifier of the first Vswitch logical port into the first data content;

sending, by the Vswitch, the first data content to a Vrouter using the first Vswitch logical port and a Virtio port shared by the Vswitch and the Vrouter;

receiving, by the Vrouter, the first data content using a first Vrouter logical port uniquely corresponding to the port identifier of the first Vswitch logical port, and sending the first data content to a first virtual network adapter corresponding to the first Vrouter logical port;

receiving, by the protocol stack, the first data content decapsulated by the first virtual network adapter, converting the first data content into second data content, and sending the second data content to a second virtual network adapter;

receiving, by the Vrouter, using a second Vrouter logical port corresponding to the second virtual network adapter, the second data content encapsulated by the second virtual network adapter, and adding a port identifier of the second Vrouter logical port into the second data content;

sending, by the Vrouter, the second data content to the Vswitch using the second Vrouter logical port and the Virtio port; and receiving, by the Vswitch, the second data content using a second Vswitch logical port uniquely corresponding to the port identifier of the second Vrouter logical port, and sending the second data content to the physical adapter.

\* \* \* \* \*